United States Patent
Mahoney et al.

(10) Patent No.: US 11,345,630 B2
(45) Date of Patent: May 31, 2022

(54) COATED GLASS ARTICLE

(71) Applicant: PILKINGTON GROUP LIMITED, Lathom (GB)

(72) Inventors: Matthew Barrington Mahoney, Pinehurst, NC (US); Neil McSporran, Detroit, MI (US); Srikanth Varanasi, Ottawa Hills, OH (US); Kyle Erik Sword, Perrysburg, OH (US); Jason Michael Shirk, Sylvania, OH (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 16/500,182

(22) PCT Filed: Apr. 5, 2018

(86) PCT No.: PCT/GB2018/050920
§ 371 (c)(1),
(2) Date: Oct. 2, 2019

(87) PCT Pub. No.: WO2018/185491
PCT Pub. Date: Oct. 11, 2018

(65) Prior Publication Data
US 2020/0123047 A1 Apr. 23, 2020

Related U.S. Application Data (60) Provisional application No. 62/482,449, filed on Apr. 6, 2017.

(51) Int. Cl.
*B32B 15/04* (2006.01)
*B32B 17/06* (2006.01)
*C03C 17/34* (2006.01)

(52) U.S. Cl.
CPC .... *C03C 17/3417* (2013.01); *C03C 2217/213* (2013.01); *C03C 2217/24* (2013.01); *C03C 2217/73* (2013.01)

(58) Field of Classification Search
CPC ............ C03C 2217/73; C03C 2217/24; C03C 17/3417; C03C 2217/213; C03C 2217/734
(Continued)

(56) References Cited

U.S. PATENT DOCUMENTS 5,362,552 A * 11/1994 Austin .................... B32B 17/06
428/216
5,780,149 A 7/1998 McCurdy et al.
(Continued)

FOREIGN PATENT DOCUMENTS

WO 02/08136 A1 1/2002

OTHER PUBLICATIONS

European Patent Office, International Search Report with Written Opinion, issued in PCT/GB2018/050920, dated Jun. 8, 2018, 11 pages, European Patent Office, Rijswick, Netherlands.

*Primary Examiner* — Lauren R Colgan
(74) *Attorney, Agent, or Firm* — Marshall & Melhorn, LLC (57) ABSTRACT

A coated glass article includes a glass substrate and an anti-reflective coating formed over a first major surface of the glass substrate. The anti-reflective coating includes a color suppression interlayer and a first coating layer deposited over the color suppression interlayer. The first coating layer includes tin oxide and a dopant. The dopant includes antimony, molybdenum, or iron. A second coating layer is deposited over the first coating layer. The second coating layer includes an oxide of silicon. The coated glass article
(Continued)

exhibits a total visible light transmittance of 70% or more and a film side visible light reflectance of less than 6.0%.

19 Claims, 2 Drawing Sheets

(58) Field of Classification Search
USPC .............................. 428/428–432, 701, 702
See application file for complete search history.

(56) References Cited

U.S. PATENT DOCUMENTS

| | | | |
|---|---|---|---|
| 6,124,026 A | 9/2000 | McCurdy et al. | |
| 6,165,598 A * | 12/2000 | Nelson | C03C 17/3417 |
| | | | 428/212 |
| 6,602,541 B1 | 8/2003 | McCurdy et al. | |
| 6,838,178 B1 | 1/2005 | Strickler et al. | |
| 7,887,921 B2 | 2/2011 | Varanasi et al. | |
| 2006/0188730 A1 * | 8/2006 | Varanasi | B32B 17/10174 |
| | | | 428/432 |

* cited by examiner

COATED GLASS ARTICLE

CROSS-REFERENCE TO RELATED APPLICATION

This application is claiming the benefit, under 35 U.S. C. 119(e), of the provisional U.S. patent application which was granted Ser. No. 62/482,449 and filed on Apr. 6, 2017, the entire disclosure of which is hereby incorporated by reference.

BACKGROUND

The invention relates to a coated glass article. More particularly, the invention relates to a coated glass article having an anti-reflective coating.

The windows of a vehicle are a prominent feature of the overall design of the vehicle and can directly impact the comfort of its passengers. For example, reflection from a window can decrease the visual comfort of the passengers. The visual comfort of the passengers may also be impacted by the visible light transmittance into the passenger compartment of the vehicle. Additionally, the climate comfort of the passengers may be affected by the solar energy transmittance into the passenger compartment.

Thus, it would be desirable to provide a coated glass article that could be utilized in a window and which improves the features of the window noted above.

SUMMARY

Embodiments of a coated glass article are provided. In an embodiment, the coated glass article comprises a glass substrate. An anti-reflective coating is formed over a first major surface of the glass substrate. The anti-reflective coating comprises a color suppression interlayer. A first coating layer is deposited over the color suppression interlayer. The first coating layer comprises tin oxide and a dopant. The dopant comprises antimony, molybdenum, or iron. A second coating layer is deposited over the first coating layer. The second coating layer comprises an oxide of silicon. The coated glass article exhibits a total visible light transmittance (Illuminant A, 2 degree observer) of 70% or more and a film side visible light reflectance (Illuminant A, 2 degree observer) of less than 6.0%.

According to a first aspect the present invention provides a coated glass article (10) comprising:
  a glass substrate (18); and
  an anti-reflective coating (20) formed over a first major surface (22) of the glass substrate (18), wherein the anti-reflective coating (20) comprises:
    a color suppression interlayer (28),
    a first coating layer (30) deposited over the color suppression interlayer (28), wherein the first coating layer (30) comprises tin oxide and a dopant, the dopant comprising antimony, molybdenum, or iron, and
    a second coating layer (32) deposited over the first coating layer (30), wherein the second coating layer (32) comprises an oxide of silicon,
  wherein the coated glass article (10) exhibits a total visible light transmittance (Illuminant A, 2 degree observer) of 70% or more and a film side visible light reflectance (Illuminant A, 2 degree observer) of less than 6.0%.

Preferably the anti-reflective coating (20) is pyrolytic.

Preferably the first coating layer (30) is deposited at a thickness of 150 nm or less, the second coating layer (32) is deposited at a thickness of 60 nm or more, and the color suppression interlayer (28) comprises a first component layer (34) deposited at a thickness of 10-50 nm and a second component layer (36) deposited at a thickness of 10-50 nm.

Preferably the color suppression interlayer (28) comprises a first component layer (34) deposited on the first major surface (22) of the glass substrate (18) and a second component layer (36) deposited over the first component layer (34), the first component layer (34) having a refractive index which is greater than a refractive index of the second component layer (36), a refractive index of the first coating layer (30), and a refractive index of the second coating layer (32).

Preferably the first coating layer (30) is deposited directly on the color suppression interlayer (28), such that there are no intervening layers between the first coating layer (30) and the color suppression interlayer (28), and the second coating layer (32) is deposited directly on the first coating layer (30), such that there are no intervening layers between the second coating layer (32) and the first coating layer (30), the second coating layer (32) forming an outer surface (38) of the coated glass article (10).

Preferably the first coating layer (30) comprises antimony doped tin oxide having an antimony concentration of 1.0-8.0 atomic percent.

Preferably the first coating layer (30) consists essentially of antimony doped tin oxide.

Preferably the oxide of silicon is silicon dioxide.

Preferably the glass substrate (18) is tinted.

Preferably coated glass article (10) exhibits, on a coating side (26) thereof, a reflected color (Illuminant A, 2 degree observer) which is of a negative a* value and a negative b* value.

Preferably the total visible light transmittance (Illuminant A, 2 degree observer) is 70-80%.

Preferably the film side visible light reflectance (Illuminant A, 2 degree observer) is 5.0% or less, preferably 4.0% or less.

Preferably the thickness of the first coating layer (30) is 100 nm or less.

Preferably the first component layer (34) comprises tin oxide and the second component layer (36) comprises an oxide of silicon.

Preferably the refractive index of the first coating layer (30) is greater than the refractive index of the second coating layer (32) and the refractive index of the second component layer (36).

Preferably the antimony concentration is 4.0-6.0 atomic percent.

Preferably the coated glass article (10) exhibits a direct solar energy transmittance of less than 65% and an emissivity of 0.70 or less.

Preferably the second coating layer (32) consists essentially of silicon dioxide.

Preferably the glass substrate (18) has a transmitted color and the transmitted color has an a* value of −6±4 and a b* value of −4±4 in the CIELAB color scale system (Illuminant A, 2 degree observer).

Preferably the thickness of the first coating layer (30) is less than 70 nm.

Preferably the thickness of the first coating layer (30) is 30-65 nm.

According to a second aspect the present invention provides a window assembly (12) comprising the coated glass article (10) of the first aspect.

BRIEF DESCRIPTION OF THE SEVERAL VIEWS OF THE DRAWINGS

The above, as well as other advantages of the present invention will become readily apparent to those skilled in the art from the following detailed description when considered in the light of the accompanying drawings in which.

DETAILED DESCRIPTION

It is to be understood that the invention may assume various alternative orientations and step sequences, except where expressly specified to the contrary. It is also to be understood that the specific layers, articles, assemblies, methods, and processes illustrated in the attached figures, and described in the following specification are simply exemplary embodiments of the inventive concepts. Hence, specific dimensions, directions, or other physical characteristics relating to the embodiments disclosed are not to be considered as limiting, unless expressly stated otherwise.

Embodiments of a coated glass article 10 in accordance with the invention will be described below.

Figure 1:
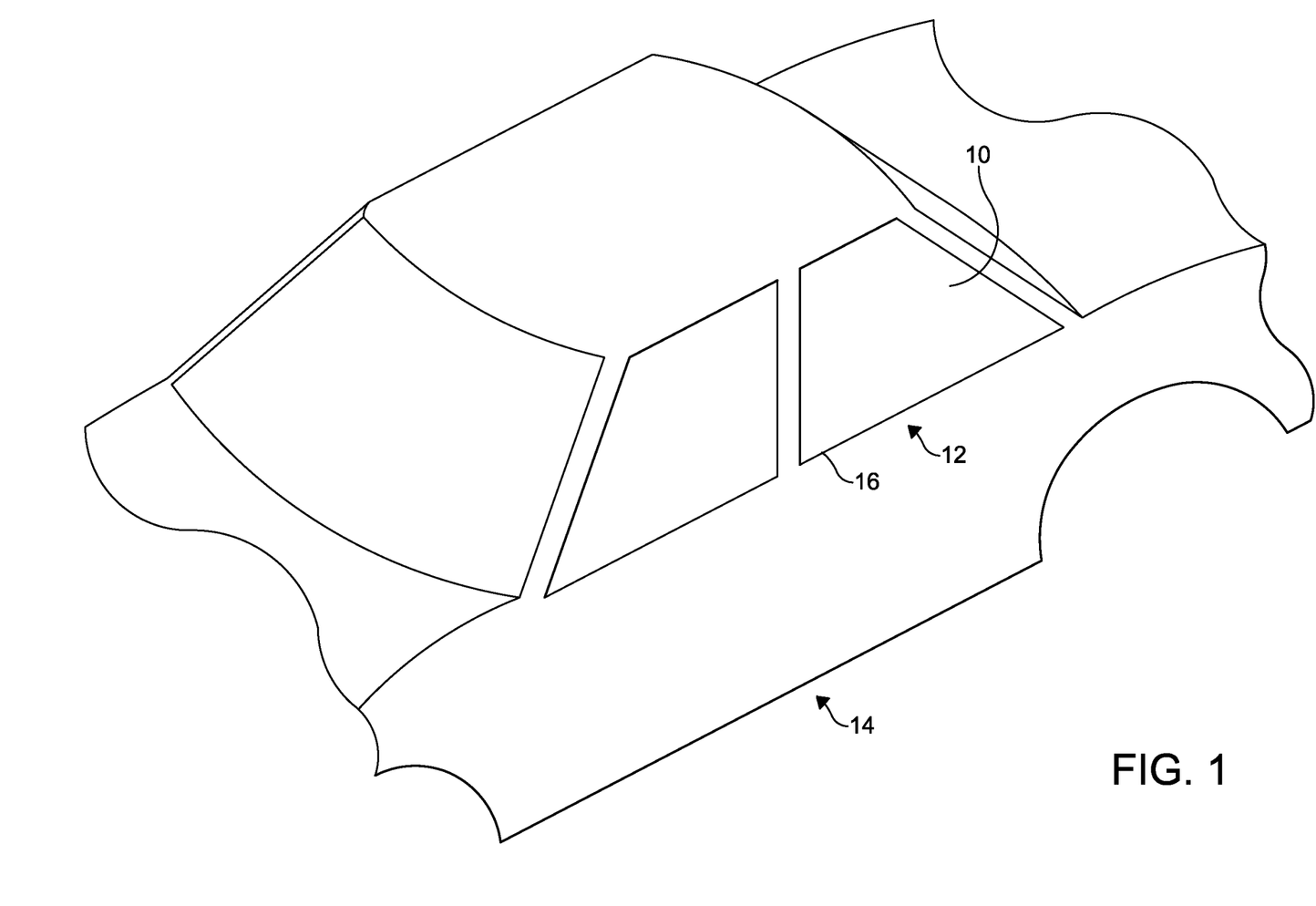
FIG. 1 is a partial perspective view of a vehicle depicting a window assembly including an embodiment of coated glass article in accordance with the invention.

The embodiments of the coated glass article 10 may be utilized as a single coated glass sheet. In one such embodiment, the coated glass article 10 is utilized as a portion of a window assembly. A window assembly 12 comprising an embodiment of the coated glass article 10 is illustrated in FIG. 1. In this embodiment, the window assembly 12 is illustrated in connection with a vehicle 14. It is preferred that the window assembly 12 is installed in a body opening 16 of the vehicle 14 so as to be a backlite or sidelite. However, it should be appreciated that the window assembly 12 could be utilized in another body opening in the vehicle 14 such as, for example, in an opening in the roof of the vehicle 14. In this embodiment (not depicted), the window assembly is a roof lite.

In other embodiments (not depicted), the coated glass article 10 may be utilized in a laminate. In one such embodiment, a window assembly, which comprises the coated glass article 10, may be utilized as a windshield for the vehicle 14. Additionally, the embodiments of the coated glass article 10 may be utilized as another glazing and/or have architectural, residential, commercial, photovoltaic, automotive, and aerospace applications.

Figure 2:
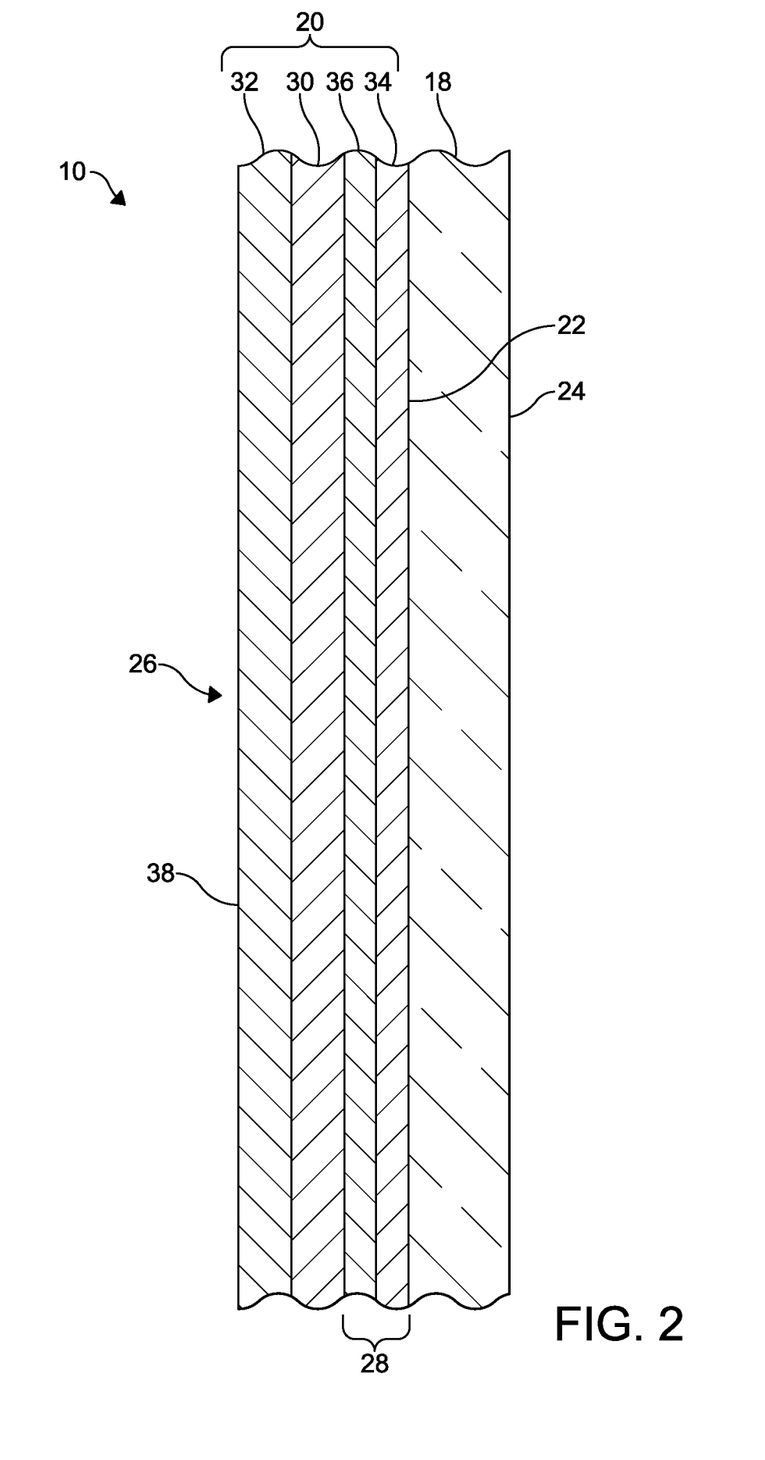
FIG. 2 is a partial sectional view of the coated glass article of FIG. 1.

FIG. 2 best illustrates an embodiment of the coated glass article 10. As illustrated in FIG. 2, the coated glass article 10 comprises a glass substrate 18. The glass substrate 18 may be of any of the conventional glass compositions known in the art. In certain embodiments, the composition of the glass substrate 18 is selected to allow the coated glass article 10 to exhibit certain properties. It is preferred that the glass substrate 18 is a soda-lime-silica glass. In this embodiment, the glass substrate 18 may be a float glass ribbon. However, the glass substrate 18 may be of another composition such as, for example, a borosilicate composition or aluminosilicate glass composition.

It should be appreciated the glass substrate 18 is not limited to a particular thickness. However, in certain embodiments, it may be preferred that the glass substrate 18 has a thickness of 6 millimeters (mm) or less. In one embodiment, the glass substrate 18 has a thickness of 2-6 mm.

The glass substrate 18 may be substantially clear. However, it is preferred that the glass substrate 18 is tinted. The color of the glass substrate 18 can vary between embodiments of the coated glass article 10. For example, the glass substrate 18 can be of a blue, green, bronze, or grey tint. Preferably, the glass substrate 18 has a blue-green tint. In this embodiment, the transmitted color of the glass substrate 18 has an a* value of −6±4, preferably −6±2, and a b* value of −4±4, preferably −2±2 in the CIELAB color scale system (Illuminant A, 2 degree observer). In embodiments where the glass substrate 18 has a blue-green tint, the glass substrate may have a composition of about 72-74 wt % of $SiO_2$, 0.45-0.52 wt % $Fe_2O_3$, 0.11-0.13 wt % $Al_2O_3$, 150-175 ppm $TiO_2$, 8.6-8.8 wt % of CaO, 4.0-4.25 wt % MgO, 13.4-13.7 wt % $Na_2O$, 0.028-0.030 wt % $K_2O$, 0.16-0.18 wt % $SO_3$, and 8-10 ppm $CO_3O_4$. Alternatively, when the glass substrate 18 has a blue-green tint, the glass substrate 18 could be of another composition that provides similar optical properties.

The glass substrate 18 may be substantially transparent to visible light. The visible light transmission of the glass substrate 18 may be a function of the thickness and composition of the glass substrate 18. The thickness and composition of the glass substrate 18 can be selected so that the glass substrate 18 has a visible light transmission (Illuminant A, 2 degree observer) of 70% or more. Preferably, the glass substrate 18 has a visible light transmission (Illuminant A, 2 degree observer) of 70-80%. Even more preferably, the glass substrate 18 has a visible light transmission (Illuminant A, 2 degree observer) of 74-78%.

An anti-reflective coating 20 is formed over the glass substrate 18. More particularly, the anti-reflective coating 20 is formed over a first major surface 22 of the glass substrate 18. Even more preferably, the anti-reflective coating 20 is formed directly on the first major surface 22 of the glass substrate 18. In certain embodiments (not depicted), the anti-reflective coating may be formed over the first major surface of the glass substrate and a second major surface of the glass substrate. However, the second major surface 24 of the glass substrate 18 may be uncoated as is illustrated in FIG. 2.

Preferably, the anti-reflective coating 20 is pyrolytic. The anti-reflective coating 20 is utilized to reduce visible light reflection from the side 26 of the coated glass article 10 that the coating 20 is formed on to increase visible light transmittance through the coated glass article 10. The side 26 of the coated glass article 10 that the coating 20 is formed on may also be referred to herein as the coating side 26 of the coated glass article 10. The anti-reflective coating 20 may also be utilized to absorb near infrared wavelengths to reduce solar energy transmittance through the coated glass article 10. In certain embodiments, the anti-reflective coating 20 also allows the coated glass article 10 to exhibit a reduced emissivity and an advantageous conductivity which enables an antistatic function.

In certain embodiments, the anti-reflective coating 20 comprises a color suppression interlayer 28, a first coating layer 30, and a second coating layer 32. In other embodiments, the anti-reflective coating 20 consists of the aforementioned layers 28-32. Each layer 28-32 may be deposited by any suitable deposition method. However, it is preferred that each layer 28-32 is deposited by atmospheric chemical vapor deposition (APCVD). Other known deposition methods are suitable for depositing one or more of the layers 28-32 such as, for example, sol-gel deposition techniques or sputter deposition techniques. In embodiments where the glass substrate 18 is a float glass ribbon, the anti-reflective coating 20 is preferably formed in a heated zone of the float glass manufacturing process.

The color suppression interlayer 28 is deposited over the first major surface 22 of the glass substrate 18. In some embodiments, the color suppression interlayer 28 is deposited directly on the first major surface 22 of the glass substrate 18. In these embodiments, there are no intervening layers between the first major surface 22 of the glass substrate 18 and the color suppression interlayer 28. Preferably, the color suppression interlayer 28 is a single component layer or a two component layer.

When the color suppression interlayer 28 is a single component layer (not depicted), the single component layer is deposited over and, preferably, directly on, the first major surface 22 of the glass substrate 18. In this embodiment, the first coating layer 30 is deposited over and, preferably, directly on, the single component layer. When the color suppression interlayer 28 is a single component layer, the suppression of color may be accomplished by forming the color suppression interlayer 28 with a material having a refractive index between the refractive index of the glass substrate 18 and the refractive index of the first coating layer 30.

As used herein, refractive index refers to a value that is related to how visible light propagates through the coated glass article. The refractive index values described below are an average value across 400-780 nm of the electromagnetic spectrum.

Preferably, when the color suppression interlayer 28 is a single component layer, the color suppression interlayer 28 has a thickness of ¼ wavelength of a 500 nanometer (nm) design wavelength. A material suitable for use in the single component color suppression interlayer is silicon oxycarbide (SiCO). However, other materials and mixtures of materials may be suitable for use in the single component color suppression interlayer. Preferably, when the color suppression interlayer 28 is a single component layer, the single component layer is pyrolytic.

When the color suppression interlayer 28 comprises two component layers, which is illustrated in FIG. 2, the color suppression interlayer 28 comprises a first component layer 34 and a second component layer 36. In this embodiment, the first component layer 34 is deposited over and, preferably, directly on, the first major surface 22 of the glass substrate 18. The second component layer 36 is deposited over and, preferably, directly on, the first component layer 34. In this embodiment, the first coating layer 30 is deposited over and, preferably, directly on, the second component layer 36.

Preferably, the first component layer 34 is pyrolytic. The first component layer 34 has a refractive index. Preferably, the refractive index of the first component layer 34 is relatively high. In an embodiment, the first component layer 34 has a refractive index of 2.6 or less. In this embodiment, the first component layer 34 may have a refractive index of 1.8-2.6. More preferably, in this embodiment, the first component layer 34 has a refractive index of 1.8-2.4.

In some embodiments, the refractive index of the first component layer 34 is greater than the refractive index of at least one other layer 30, 32, 36 of the anti-reflective coating 20. In one such embodiment, the refractive index of the first component layer 34 is greater than a refractive index of the second component layer 36. In another embodiment, the refractive index of the first component layer 34 is greater than a refractive index of the first coating layer 30. The refractive index of the first component layer 34 may also be greater than a refractive index of the second coating layer 32. Further, in certain embodiments, the refractive index of the first component layer 34 is greater than the refractive indices of the other layers 30, 32, 36 of the anti-reflective coating 20.

It is preferred that the first component layer 34 comprises an inorganic metal oxide. In certain embodiments, the first component layer 34 comprises tin oxide ($SnO_2$), titanium dioxide ($TiO_2$), or another suitable inorganic metal oxide. In these embodiments, the first component layer 34 may consist essentially of tin oxide, titanium dioxide, or another suitable inorganic metal oxide.

When the first component layer 34 comprises tin oxide, the first component layer 34 may have a refractive index of 1.8-2.0. Preferably, when the first component layer 34 comprises tin oxide, the first component layer 34 has a refractive index of 1.9-2.0. When the first component layer 34 comprises titanium dioxide, the first component layer 34 may have a refractive index of 2.2-2.6. Preferably, when the first component layer 34 comprises titanium dioxide, the first component layer 34 has a refractive index of 2.2-2.4.

Preferably, the first component layer 34 is deposited at a thickness of 5-50 nm. More preferably, the first component layer 34 is deposited at a thickness of 10-40 nm. In embodiments where the first component layer 34 comprises tin oxide, it may be preferred that the thickness of the first component layer 34 is 20-28 nm. In embodiments where the first component layer 34 comprises titanium dioxide, the thickness of the first component layer 34 may be 5-20 nm. Preferably, in embodiments where the first component layer 34 comprises titanium dioxide, the thickness of the first component layer 34 is 10-15 nm.

Preferably, the second component layer 36 is pyrolytic. Also, it is preferred that the second component layer 36 comprises an oxide of silicon. A preferred oxide of silicon for the second component layer 36 is silicon dioxide ($SiO_2$). Thus, in an embodiment, the second component layer 36 comprises silicon dioxide. In another embodiment, the second component layer 36 consists essentially of silicon dioxide.

The refractive index of the second component layer 36 is less than the refractive index of the first component layer 34. Preferably, the refractive index of the second component layer 36 is less than the refractive index of the first coating layer 30. Also, the refractive index of the second component layer 36 may be similar or the same as the refractive index of the second coating layer 32. In certain embodiments, the refractive index of the second component layer 36 is 1.6 or less. Preferably, in embodiments where the second component layer 36 comprises silicon dioxide, the second component layer 36 has a refractive index of 1.46.

In embodiments where the second component layer 36 comprises silicon dioxide, the thickness of the second component layer 36 is 10-50 nm. Preferably, in these embodiments, the thickness of the second component layer 36 is 15-40 nm.

More preferably, for these embodiments, the thickness of the second component layer 36 is 20-28 nm.

Preferably, the first coating layer 30 is pyrolytic. The first coating layer 30 is deposited over and, preferably, directly on the color suppression interlayer 28. In embodiments where the first coating layer 30 is deposited directly on the color suppression interlayer 28, there are no intervening layers between the first coating layer 30 and the color suppression interlayer 28.

It is preferred that when the color suppression interlayer 28 is a single component layer, the refractive index of the first coating layer 30 is greater than the refractive index of the color suppression interlayer 28. Also, it is preferred that when the color suppression interlayer 28 comprises two component layers 34, 36, the refractive index of the first coating layer 30 is greater than the refractive index of the second component layer 36. Preferably, the refractive index of the first coating layer 30 is greater than the refractive index of the second coating layer 32.

In an embodiment, the first coating layer 30 has a refractive index which is less than 2.1. Preferably, the refractive index of the first coating layer 30 is between 1.6 and 2.1. For example, the refractive index of the first coating layer 30 may be 1.7-2.0. Preferably, the refractive index of the first coating layer 30 is 1.7-1.85.

In these embodiments, it is preferred that the first coating layer 30 comprises tin oxide and a dopant. Preferably, the dopant comprises antimony (Sb), molybdenum (Mo), or iron (Fe). However, other suitable dopants may be utilized. The preferred dopant of the first coating layer 30 is antimony. Thus, it is preferred that the first coating layer 30 comprises antimony doped tin oxide ($SnO_2$:Sb). In an embodiment, the first coating layer 30 consists essentially of antimony doped tin oxide. However, in other embodiments, the first coating layer 30 may comprise iron doped tin oxide ($SnO_2$:Fe) or molybdenum doped tin oxide ($SnO_2$:Mo). In an embodiment, the first coating layer 30 may consist essentially of iron doped tin oxide. In another embodiment, the first coating layer 30 may consist essentially of molybdenum doped tin oxide.

It is preferred that the first coating layer 30 is formed in such a manner that the first coating layer 30 is the primary contributor to the absorbance of the anti-reflective coating 20. The absorbance of the anti-reflective coating 20 reduces the solar energy transmittance through the coated glass article 10. A first coating layer 30 comprising antimony doped tin oxide is a preferred because doping tin oxide with antimony increases the absorbance and the conductivity of the tin oxide. In an embodiment, the first coating layer 30 has a conductive which is greater than a conductivity of the color suppression interlayer 28. Also, in this embodiment, the first coating layer 30 may have a conductive which is greater than a conductivity of the second coating layer 32. In these embodiments, the sheet resistance of the anti-reflective coating 20 may be 500 ohms/sq. or less.

The concentration of the dopant in the first coating layer 30 can vary between embodiments of the coated glass article 10. However, it is preferred that when the first coating layer 30 comprises antimony doped tin oxide, the antimony doped tin oxide has an antimony concentration of 1.0-8.0 atomic percent. Preferably, the antimony concentration is 1.5-7.0 atomic percent. More preferably, in these embodiments, the antimony concentration is 4.0-6.0 atomic percent. When the first coating layer 30 comprises iron doped tin oxide, the iron doped tin oxide has an iron concentration of more than 1.5 atomic percent. Preferably, the iron concentration is 1.5-8.0 atomic percent. When the first coating layer 30 comprises molybdenum doped tin oxide, the molybdenum doped tin oxide has a molybdenum concentration of more than 1.5 atomic percent. Preferably, the molybdenum concentration is 1.5-8.0 atomic percent.

It is preferred that the first coating layer 30 is deposited over the color suppression interlayer 28 at a thickness of 150 nm or less. More preferably, the thickness of the first coating layer 30 is 100 nm or less. Even more preferably, the thickness of the first coating layer 30 is less than 70 nm. In this embodiment, the thickness of the first coating layer 30 may be 30-65 nm. More preferably, in this embodiment, the thickness of the first coating layer 30 is 35-65 nm. In embodiments where the first coating layer 30 comprises antimony doped tin oxide, it is preferred that the antimony concentration increases as the thickness of the first coating layer 30 decreases. Thus, as an example, when the thickness of the first coating layer 30 is 35 nm, the antimony concentration may be between 6.0 and 7.0 atomic percent. Alternatively, as another example, when the thickness of the first coating layer 30 is about 70 nm, the antimony concentration may be between 4.0 and 6.0 atomic percent.

The second coating layer 32 is deposited over and, preferably, directly on the first coating layer 30. In embodiments where the second coating layer 32 is deposited directly on the first coating layer 30, there are no intervening layers between the second coating layer 32 and the first coating layer 30. Preferably, the second coating layer 32 forms the outermost layer and an outer surface 38 of the coated glass article 10. In certain embodiments, the second coating layer 32 is pyrolytic.

Preferably, the second coating layer 32 has a refractive index which is relatively low. In an embodiment, the refractive index of the second coating layer 32 is, for example, 1.6 or less. It is preferred that the refractive index of the second coating layer 32 is less than the refractive index of the first coating layer 30.

Also, it is preferred that the second coating layer 32 comprises an oxide of silicon. A preferred oxide of silicon for the second coating layer 32 is silicon dioxide ($SiO_2$). Thus, in an embodiment, the second coating layer 32 comprises silicon dioxide. In another embodiment, the second coating layer 32 consists essentially of silicon dioxide. Preferably, in embodiments where the second coating layer 32 comprises silicon dioxide, the second coating layer 32 has a refractive index of 1.46. However, the second coating layer 32 may comprise other suitable materials and/or have a different refractive index value.

In certain embodiments, the second coating layer 32 is deposited over the first coating layer 30 at a thickness of 60 nm or more. Preferably, the thickness of second coating layer 32 is 60-120 nm. More preferably, the thickness of the second coating layer 32 is 70-100 nm.

Due to the configuration of the glass substrate 18 and presence of the anti-reflective coating 20, the embodiments of the coated glass article 10 exhibit an advantageous total visible light transmittance and film side visible light reflectance. For describing the coated glass article 10, total visible light transmittance will refer to the percentage of visible light passing through the coated glass article 10 as measured from the coating side 26 of the coated glass article 10. Also, for describing the coated glass article 10, film side visible light reflectance will refer to the percentage of visible light reflected from the coated glass article 10 as measured from the coating side 26 of the coated glass article 10. Preferably, in the embodiments described above, the coated glass article 10 exhibits a total visible light transmittance (Illuminant A, 2 degree observer) of 70% or more. More preferably, the total visible light transmittance (Illuminant A, 2 degree observer) is 70-80%. Even more preferably, the total visible light transmittance (Illuminant A, 2 degree observer) of the coated glass article 10 is 70-75%. Additionally, the coated glass article 10 exhibits a film side visible light reflectance (Illuminant A, 2 degree observer) of 6.0% or less. Preferably, in the embodiments described above, the coated glass article 10 exhibits a film side visible light reflectance (Illuminant A, 2 degree observer) of 5.0% or less. More preferably, the film side visible light reflectance (Illuminant A, 2 degree observer) is 4.0% or less. Even more preferably, the film side visible light reflectance (Illuminant A, 2 degree observer) of the coated glass article 10 is 3.5% or less.

Due to the composition of the first coating layer 30, the coated glass article 10 may also exhibit an improved solar energy transmittance. As used herein, direct solar energy transmittance (Tsol) refers to solar transmittance integrated over the wavelength range 300 to 2500 nm according to the relative solar spectral distribution for air mass 1.5. Also, as used herein, total solar energy transmittance (TTS) refers to the fraction of incident solar radiation over the wavelength range 0.3 to 40 microns admitted through a window, both directly transmitted and absorbed and subsequently released inward. In an embodiment, the coated glass article 10 exhibits a direct solar energy transmittance of less than 65%. Preferably, the direct solar energy transmittance exhibited by the coated glass article 10 is 55% or less. More preferably, the direct solar energy transmittance exhibited by the coated glass article 10 is less than 50%. In other embodiments, the coated glass article 10 exhibits a total solar energy transmittance of 70% or less. Preferably, the total solar energy transmittance exhibited by the coated glass article 10 is less than 65%.

Also, due to the composition of the first coating layer 30, the coated glass article 10 may also exhibit an advantageous sheet resistance and emissivity. For example, the coated glass article 10 may exhibit a sheet resistance of 500 ohm/sq. or less. In an embodiment, the coated glass article 10 may exhibit a sheet resistance of 100-500 ohm/sq. In other embodiments, the coated glass article 10 exhibits an emissivity of 0.70 or less.

The coated glass article 10 may also exhibit other properties which are advantageous. For example, it should also be noted that the coated glass article 10 not only exhibits advantageous visible light transmittance and reflectance properties but may also exhibit a near neutral transmitted color for the visible light transmitted through the coated glass article 10 when viewed at a normal angle (8 degrees) incident from the coated glass article 10. For the purpose of describing the embodiments of the coated glass article 10 disclosed herein, a neutral color for the visible light transmitted through or reflected from the coated glass article 10 is defined under the CIELAB color scale system (Illuminant A, 2 degree observer) with an a* value in the range of about −6 to about 6 and a b* value in the range of about −6 to 6. Also, it should also be noted that, for certain embodiments or applications described herein, a non-neutral reflected and/or transmitted color may be desirable and can be exhibited by the coated glass article 10. In certain embodiments, the coated glass article 10 exhibits a transmitted color (Illuminant A, 2 degree observer) in a range from about −9 to about −4 for the a* value and a range from about −6 to about −1 for the b* value. Preferably, the coated glass article 10 exhibits, from the coating side 26 thereof, a reflected color (Illuminant A, 2 degree observer) which is of a negative a* value and a negative b* value. In some embodiments, the reflected color (Illuminant A, 2 degree observer) from the coating side 26 of the coated glass article 10 is in a range from about −10 to about 6 for the a* value and a range from about −10 to about 0 for the b* value. It should be appreciated that a negative a* value indicates a green color hue and a negative b* value indicates a blue color hue. Whereas, a positive a* value indicates a red color hue and a positive b* value indicates a yellow color hue. Also, the coated glass article 10 may exhibit a low haze value. For example, the coated glass article 10 may exhibit haze of 0.5% or less.

EXAMPLES

The following examples are presented solely for the purpose of further illustrating and disclosing the embodiments of the coated glass article.

Examples of coated glass articles within the scope of the invention are described below and illustrated in TABLEs 1-2. In TABLEs 1-2, the coated glass articles within the scope of the invention are Ex 1-Ex 4. A comparative example, not considered to be part of the invention, is also described below and illustrated in TABLE 1.

In TABLE 1, an illustrative example and an embodiment of the coated glass article is designated as Ex 1. The comparative example is designated as C1. Also, in TABLE 1, the columns list properties of the coated glass article of Ex 1 and the glass article of C1.

The glass article of C1 consisted of a soda-lime-silica glass substrate. The glass substrate was of a blue-green color and a thickness of 5 mm. The glass substrate of C1 was formed using the float glass manufacturing process.

The following experimental conditions are applicable to Ex 1. For Ex 1, an anti-reflective coating was formed over a first major surface of a glass substrate as the glass substrate was being formed and moving in conjunction with the float glass manufacturing process. The glass substrate of Ex 1 was similar to the glass article of C1. Thus, the glass substrate of Ex 1 was of a soda-lime-silica composition and a blue-green color. Also, the thickness of the glass substrate was 5 mm. The anti-reflective coating was pyrolytic and formed over the glass substrate by depositing a two component color suppression interlayer, a first coating layer, and a second coating layer. The color suppression interlayer, first coating layer, and second coating layer were each formed by utilizing an APCVD process.

For Ex 1, the first component layer was deposited directly on the glass substrate and comprised tin oxide. The thickness of the first component layer was 15-25 nm. After depositing the first component layer, the second component layer was deposited. The second component layer was deposited directly on the first component layer and comprised silicon dioxide. The thickness of the second component layer was 15-25 nm. After depositing the second component layer, the first coating layer was deposited. The first coating layer was deposited directly on the second component layer and comprised antimony doped tin oxide. The thickness of the first coating layer was 98.3 nm. After depositing the first coating layer, the second coating layer was deposited. The second coating layer was deposited directly on the first coating layer and comprised silicon dioxide. The thickness of the second coating layer was 75.1 nm. Thus, the coated glass article of Ex 1 is of a glass/$SnO_2$/$SiO_2$/$SnO_2$:Sb/$SiO_2$ arrangement.

The total visible light transmittance (Tvis) (Illuminant A, 2 degree observer), transmitted color (Ta*, Tb*) (Illuminant A, 2 degree observer), film side visible light reflectance (Rf) (Illuminant A, 2 degree observer), reflected color (Ra*, Rb*) (Illuminant A, 2 degree observer), off-angle reflected color (Ra* off-angle, Rb* off-angle) (Illuminant A, 2 degree observer), direct solar energy transmittance (Tsol), total solar energy transmittance (TTS), and haze of the coated glass article of Ex 1 are reported in TABLE 1. The total visible light transmittance and transmitted color were measured on the coating side of the coated glass article using a spectrophotometer. The total visible light transmittance is expressed as a percentage. The film side visible light reflectance and reflected color were measured on the coating side of the coated glass article using a spectrophotometer. The film side visible light reflectance is expressed as a percentage. The off-angle reflected color was measured on the coating side of the coated glass article at an angle of incidence of 45 degrees. The direct solar energy transmittance and total solar energy transmittance are expressed as percentages and were measured using a spectrophotometer.

The haze was measured on the coating side of the coated glass article using a haze meter and is expressed as a percentage.

The thickness of each layer is reported in TABLE 2 in nanometers. The total visible light transmittance (Tvis) (Illuminant A, 2 degree observer), transmitted color (Ta*,

TABLE 1

| Examples | Tvis | Ta* | Tb* | R | Rf | Ra* | Rb* | Ra* off-angle | Rb* off-angle | Tsol | TTS | Haze |
|---|---|---|---|---|---|---|---|---|---|---|---|---|
| C1 | 76.5 | −6.95 | −3.1 | 7.1 | — | 2.0 | −1.5 | — | — | 55.2 | 65.8 | — |
| Ex 1 | 72.06 | −6.97 | −3.6 | — | 3.43 | −7.81 | −4.31 | −3.4 | 0.65 | 46.9 | 61.4 | 0.15 |

As shown in TABLE 1, the coated glass article of Ex 1 exhibited a total visible light transmittance of more than 70% and a film side visible light reflectance of less than 5.0%. More particularly, the total visible light transmittance of the coated glass article of Ex 1 was between 70 and 75% and the film side visible light reflectance was less than 4.0%. In stark contrast, the glass article of C1 exhibited a higher total visible light transmittance and a higher visible light reflectance than the coated glass article of Ex 1.

Also, the coated glass article of Ex 1 exhibited other properties which are advantageous. For example, the coated glass article of Ex 1 exhibited a direct solar energy transmittance of less than 50% and a total solar energy transmittance of less than 65%. In comparison, the glass article of C1 exhibited a direct solar energy transmittance of more than 55% and a total solar energy transmittance of more than 65%. Also, the coated glass article of Ex 1 exhibited low haze, a sheet resistance of 430 ohm/sq., an emissivity of 0.66, and a reflected color having a negative a* value and a negative b* value.

The coated glass articles of Ex 2-Ex 4 are described below and illustrated in TABLE 2.

The coated glass articles of Ex 2-Ex 4 are predictive and were modeled. Each of the coated glass articles of Ex 2-Ex 4 comprised a glass substrate. Each glass substrate had a thickness of 5 mm, a soda-lime-silica composition, and was of a blue-green color. Each of the coated glass articles of Ex 2-Ex 4 also comprised an anti-reflective coating formed over a first major surface of the glass substrate. Each anti-reflective coating comprised a two component color suppression interlayer, a first coating layer, and a second coating layer.

For each of the of the coated glass articles of Ex 2-Ex 4, the first component layer is deposited directly on the glass substrate and comprised tin oxide. The second component layer is deposited directly on the first component layer and comprised silicon dioxide. The first coating layer is deposited directly on the second component layer and comprised antimony doped tin oxide. For Ex 2, the atomic percentage of antimony in the first coating layer was 1.98. For Ex 3, the atomic percentage of antimony in the first coating layer was 5.15. For Ex 4, the atomic percentage of antimony in the first coating layer was 6.25. The second coating layer is deposited directly on the first coating layer and comprised silicon dioxide. Thus, the coated glass articles of Ex 2-Ex 4 are of a glass/$SnO_2$/$SiO_2$/$SnO_2$:Sb/$SiO_2$ arrangement.

Tb*) (Illuminant A, 2 degree observer), film side visible light reflectance (Rf) (Illuminant A, 2 degree observer), reflected color (Ra*, Rb*) (Illuminant A, 2 degree observer), direct solar energy transmittance (Tsol), and total solar energy transmittance (TTS) of the coated glass articles of Ex 2-Ex 4 are also reported in TABLE 2. The total visible light transmittance, transmitted color, film side visible light reflectance, reflected color, direct solar energy transmittance, and total solar energy transmittance were calculated by optical modeling. The total visible light transmittance, transmitted color, film side visible light reflectance, and reflected color are reported for the coating side of the coated glass articles of Ex 2-Ex 4. The total visible light transmittance and film side visible light reflectance are expressed as percentages.

TABLE 2

| Examples | $SnO_2$ | $SiO_2$ | $SnO_2$:Sb | $SiO_2$ | Tvis | Ta* | Tb* | Rf | Ra* | Rb* | Tsol | TTS |
|---|---|---|---|---|---|---|---|---|---|---|---|---|
| Ex 2 | 17.8 | 21.4 | 100.0 | 85.0 | 72.3 | −5.9 | −1.0 | 3.1 | −3.3 | −3.2 | 51.6 | 62.9 |
| Ex 3 | 18.8 | 21.0 | 69.0 | 85.0 | 72.6 | −6.7 | −1.3 | 2.92 | −2.9 | −5.7 | 50.8 | 62.0 |
| Ex 4 | 23.0 | 20.0 | 35.0 | 85.0 | 71.9 | −6.1 | −1.7 | 2.9 | 4.9 | −9.4 | 50.9 | 62.1 |

As shown in TABLE 2, each of the coated glass articles of Ex 2-Ex 4 exhibited a total visible light transmittance (Illuminant A, 2 degree observer) of more than 70%. More particularly, the total visible light transmittance (Illuminant A, 2 degree observer) for each coated glass articles of Ex 2-Ex 4 was between 70 and 80%. Also, the film side visible light reflectance of each of the coated glass article of Ex 2-Ex 4 was less than 5.0%. More particularly, the film side visible light reflectance of each of the coated glass article of Ex 2-Ex 4 was less than 4.0%. Also, each coated glass article of Ex 2-Ex 4 exhibited a direct solar energy transmittance of less than 55% and a total solar energy transmittance of less than 65%. Additionally, the coated glass articles of Ex 2 and Ex 3 each exhibited a reflected color having a negative a* value and a negative b* value. Whereas, the coated glass article of Ex 2 exhibited a neutral color for the visible light transmitted through and reflected from the coated glass article, the coated glass article of Ex 3 exhibited a neutral color in only reflection.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A coated glass article comprising:
   a glass substrate; and
   an anti-reflective coating formed over a first major surface of the glass substrate, wherein the anti-reflective coating comprises:
      a color suppression interlayer,
      a first coating layer deposited over the color suppression interlayer, wherein the first coating layer comprises tin oxide and a dopant, the dopant comprising antimony, molybdenum, or iron, and
      a second coating layer deposited over the first coating layer, wherein the second coating layer comprises an oxide of silicon,
   wherein the coated glass article exhibits a total visible light transmittance (Illuminant A, 2 degree observer) of 70% or more and a film side visible light reflectance (Illuminant A, 2 degree observer) of less than 6.0%, and
   wherein the thickness of the first coating layer is 100 nm or less.

2. The coated glass article of claim 1, wherein the anti-reflective coating is pyrolytic.

3. The coated glass article of claim 1, wherein the second coating layer is deposited at a thickness of 60 nm or more, and the color suppression interlayer comprises a first component layer deposited at a thickness of 10-50 nm and a second component layer deposited at a thickness of 10-50 nm.

4. The coated glass article of claim 3, wherein the first component layer comprises tin oxide and the second component layer comprises an oxide of silicon.

5. The coated glass article of claim 3, wherein the refractive index of the first coating layer is greater than the refractive index of the second coating layer and the refractive index of the second component layer.

6. The coated glass article of claim 1, wherein the color suppression interlayer comprises a first component layer deposited on the first major surface of the glass substrate and a second component layer deposited over the first component layer, the first component layer having a refractive index which is greater than a refractive index of the second component layer, a refractive index of the first coating layer, and a refractive index of the second coating layer.

7. The coated glass article of claim 1, wherein the first coating layer is deposited directly on the color suppression interlayer, such that there are no intervening layers between the first coating layer and the color suppression interlayer, and the second coating layer is deposited directly on the first coating layer, such that there are no intervening layers between the second coating layer and the first coating layer, the second coating layer forming an outer surface of the coated glass article.

8. The coated glass article of claim 1, wherein the first coating layer comprises antimony doped tin oxide having an antimony concentration of 1.0-8.0 atomic percent.

9. The coated glass article of claim 8, wherein the antimony concentration is 4.0-6.0 atomic percent.

10. The coated glass article of claim 1, wherein the first coating layer consists essentially of antimony doped tin oxide.

11. The coated glass article of claim 1, wherein the oxide of silicon is silicon dioxide.

12. The coated glass article of claim 1, wherein the glass substrate is tinted.

13. The coated glass article of claim 1, wherein coated glass article exhibits, on a coating side thereof, a reflected color (Illuminant A, 2 degree observer) which is of a negative a* value and a negative b* value and/or wherein the glass substrate has a transmitted color and the transmitted color has an a* value of −6±4 and a b* value of −4±4 in the CIELAB color scale system (Illuminant A, 2 degree observer).

14. The coated glass article of claim 1, wherein the total visible light transmittance (Illuminant A, 2 degree observer) is 70-80% and/or wherein the film side visible light reflectance (Illuminant A, 2 degree observer) is 5.0% or less.

15. The coated glass article of claim 1, wherein the coated glass article exhibits a direct solar energy transmittance of less than 65% and an emissivity of 0.70 or less.

16. The coated glass article of claim 1, wherein the second coating layer consists essentially of silicon dioxide.

17. The coated glass article of claim 1, wherein the thickness of the first coating layer is less than 70 nm.

18. The coated glass article of claim 1, wherein the thickness of the first coating layer is 30-65 nm.

19. A window assembly comprising the coated glass article of claim 1.

* * * * *